(12) United States Patent
Hill

(10) Patent No.: US 6,701,963 B1
(45) Date of Patent: Mar. 9, 2004

(54) FLOW CONDITIONER

(75) Inventor: James A. Hill, Haverhill, MA (US)

(73) Assignee: Horiba Instruments, Inc., Irvine, CA (US)

( * ) Notice: Subject to any disclaimer, the term of this patent is extended or adjusted under 35 U.S.C. 154(b) by 0 days.

(21) Appl. No.: 10/435,846

(22) Filed: May 12, 2003

(51) Int. Cl.$^7$ .............................................. F15D 1/02
(52) U.S. Cl. .................. 138/39; 138/42; 138/116; 138/44; 366/340
(58) Field of Search .................. 138/44, 39, 40, 138/42, 116, 37, 115; 366/340

(56) References Cited

U.S. PATENT DOCUMENTS

| | | | |
|---|---|---|---|
| 2,420,715 A | * 5/1947 | Millward | 138/116 |
| 3,105,570 A | * 10/1963 | Bezemes | 181/268 |
| 3,110,754 A | * 11/1963 | Witort et al. | 174/70 R |
| 3,625,258 A | * 12/1971 | Phelps | 138/115 |
| 3,645,298 A | * 2/1972 | Roberts et al. | 138/40 |
| 3,838,598 A | * 10/1974 | Tompkins | 73/861.52 |
| 3,840,051 A | * 10/1974 | Akashi et al. | 138/37 |
| 4,408,892 A | * 10/1983 | Combes et al. | 366/337 |
| 4,841,781 A | 6/1989 | Khalifa | 138/39 X |
| 5,255,716 A | * 10/1993 | Wilcox | 138/44 |
| 5,341,848 A | * 8/1994 | Laws | 138/44 |
| 5,529,093 A | 6/1996 | Gallagher et al. | 138/44 |
| 5,588,635 A | * 12/1996 | Hartman | 251/127 |
| 5,762,107 A | * 6/1998 | Laws | 138/44 |
| 5,959,216 A | 9/1999 | Hocquet et al. | 73/861.19 |
| 6,145,544 A | 11/2000 | Dutertre et al. | 138/39 |
| 6,186,179 B1 | 2/2001 | Hill | 138/39 |
| 2002/0117224 A1 | * 8/2002 | Vakili | 138/39 |

* cited by examiner

*Primary Examiner*—Patrick Brinson
(74) *Attorney, Agent, or Firm*—Brooks Kushman P.C.

(57) ABSTRACT

A flow conditioner includes a body composed of an array of vanes generally parallel to the direction of fluid flow. The vanes create a plurality of chambers to effectively reduce large scale vortices in the flow. The vanes have surfaces with perforations to allow pressure regulation between chambers to effectively reduce asymmetric flow and reduce drag. Additional preferred features include an acoustic choke created by a reduction in cross-sectional flow area at the entrance and the exit of the flow conditioner with circular plates. The plates have rough edges to increase production of micro-vortices.

26 Claims, 2 Drawing Sheets

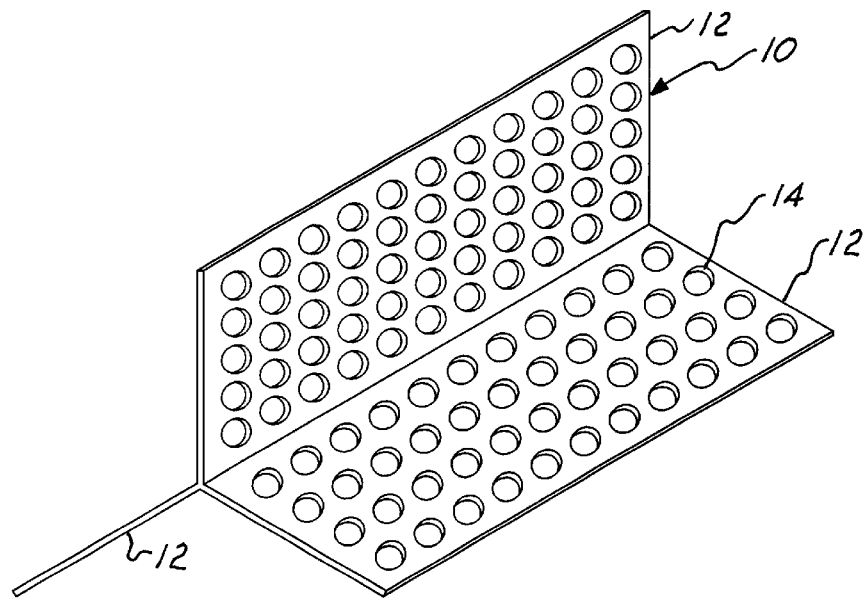
FIG. 1
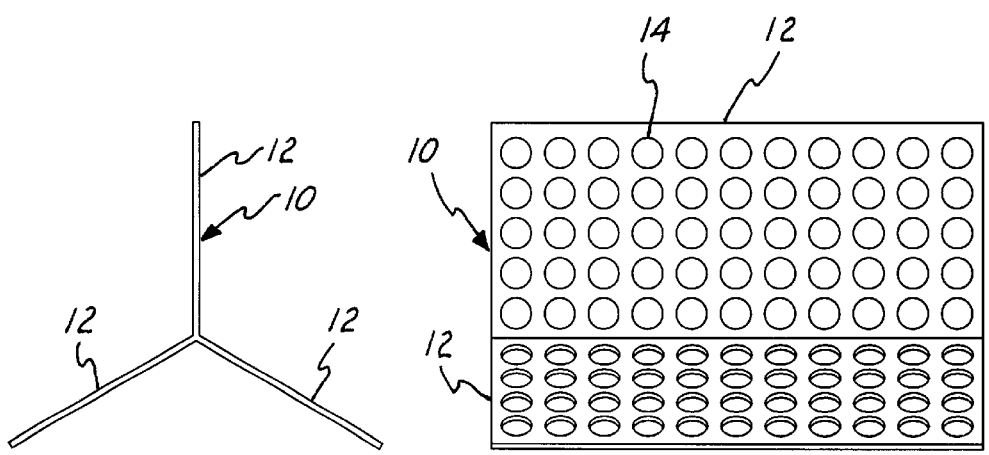
FIG. 2
FIG. 3

FLOW CONDITIONER

BACKGROUND OF THE INVENTION

1. Field of the Invention

The present invention relates to flow conditioners. Flow conditioners are used to create uniform flow field distributions to isolate fluid handling equipment and flow measurement devices from the effects of unstable or distorted flow fields entering the devices.

2. Background Art

Existing flow conditioners are typically either a thin perforated plate mounted perpendicular to the direction of flow, or a stack of tubes or rectangular channels aligned with the flow. Both of these existing flow conditioning techniques are effective at reducing an asymmetric flow field, but do so at the cost of a high pressure drop across the flow conditioner. These existing techniques also do not effectively reduce pulsation in the flow velocity or effectively reduce a high degree of vorticity in the flow field. To reduce the pressure drop across a flow conditioning device to a level that does not affect system operation, the blocking ratio should be low, for example, under 10%.

The classic Etolie swirl eliminator is an array of radial vanes parallel to the flow. The classic Etolie device has a low blocking ratio and effectively reduces large scale vortices in the flow. However, the classic Etolie device does not effectively reduce pulsation in the flow velocity, nor does the device effectively reduce an asymmetric flow field. Further, the classic Etolie device has an additional shortcoming in that it fails to remove the hysteresis in the transition between turbulent and laminar flow conditions or to reduce the length of straight conduit required for the flow conditions to develop fully.

Additional background information may be found in U.S. Pat. Nos. 6,186,179; 5,959,216; 6,145,544; 5,762,107; 5,529,093; and 4,841,781.

For the foregoing reasons, there is a need for an improved flow conditioner.

SUMMARY OF THE INVENTION

It is an object of the present invention to provide a low pressure drop flow conditioner with porous axial vanes.

In carrying out the present invention, a flow conditioner is provided. The flow conditioner comprises a body composed of an array of vanes or fins generally parallel to the direction of fluid flow to create a plurality of chambers. The vanes effectively reduce large scale vortices in the flow. To effectively reduce asymmetric flow, pores or perforations are made to the vane surfaces. These pores/perforations allow for pressure equalization between chambers and reduce drag.

At a more detailed level, the present invention comprehends arranging the vanes in a radial fashion, preferably with each vane extending radially from a central axis. The flow conditioner may have as few as three vanes. The porosity of the vanes preferably ranges from 35% to 70%. The perforations can be made in any shape, for example, circular, oval, diamond, rectangular or triangular and at any orientation with respect to the sheets composing the vane. The holes in the vane can be flush with the vane plate or have a small dimple where they were punched out of the sheet.

In preferred embodiments, to counter pulsation, a slight restriction in the cross-sectional area at the entrance and exit of the flow conditioner causes the volume between to be an acoustic choke. A contemplated implementation of this feature uses a circular plate at each end of the vane array. The circular plates are placed at the formed vertices of the vanes when the vanes are arranged in the radial fashion. More preferably, roughening the circular plates around their circumferences will increase the production of micro-vortices which cause a stable and repeatable trip between turbulent and laminar flow states. The circular plates (or rings) act as a turbulence trip and micro-vortex shedder, and may be solid, perforated, or annular.

For very low pressure drop applications, the circular plates can be as small as ⅙ the diameter of the conduit conducting the fluid. For other applications where a choke of 25% is acceptable, the diameter of the disk can be as large as ½ the diameter of the conduit.

Further, in carrying out the present invention, various flow conditioners are provided in combination with conduits to reduce vortices and asymmetric flow. The combinations employ various features described above.

The advantages associated with embodiments of the present invention are numerous. For example, preferred embodiments of the present invention effectively remove large scale vortices in the flow, reduce pulsation in the flow velocity, reduce asymmetric flow field, and increase the rate of flow development from turbulent flow to laminar flow.

The above object and other objects, features, and advantages of the present invention are readily apparent from the following detailed description of the preferred embodiments when taken in connection with the accompanying drawings.

BRIEF DESCRIPTION OF THE DRAWINGS

FIGS. 1–3 illustrate a first embodiment of the flow conditioner of the present invention;

DETAILED DESCRIPTION OF THE PREFERRED EMBODIMENTS

FIGS. 1–3 illustrate a first embodiment of a flow conditioning device. The flow conditioner is for placement within a conduit to condition fluid flow therethrough, and includes a body 10. Body 10 is composed of an array of vanes 12 generally parallel to the direction of fluid flow and arranged in a radial fashion with each vane 12 extending radially from a central axis. Vanes 12 create a plurality of chambers to effectively reduce large scale vortices in the flow. Vanes 12 have surfaces with perforations 14 to allow pressure regulation between chambers to effectively reduce asymmetric flow and reduce drag. The three vanes 12 have vane surfaces with a porosity between 35% and 70%.

Figure 4:
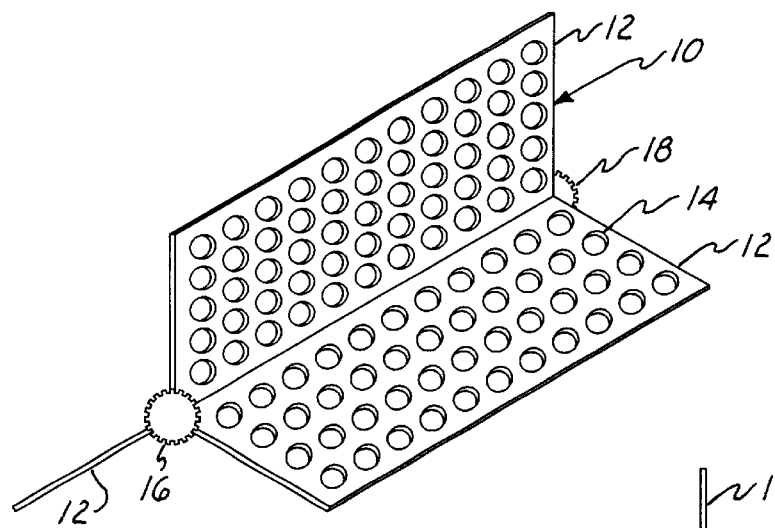
FIGS. 4–6 illustrate a second embodiment of the flow conditioner of the present invention.
Figure 5:
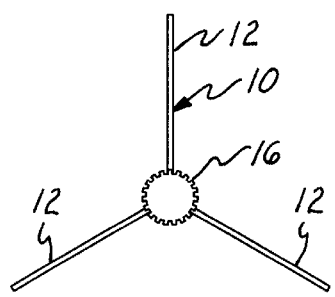
Figure 6:
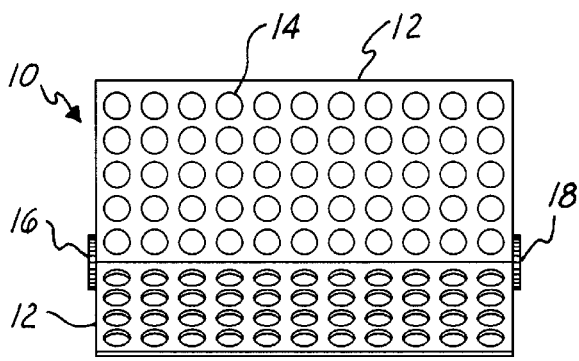

FIGS. 4–6 illustrate a second embodiment of a flow conditioning device. Identical reference numerals have been used to indicate identical parts from FIGS. 1–3. In FIGS. 4–6, body 10 is configured to create a slight restriction in cross-sectional flow area at the entrance and exit of the flow conditioner. The restrictions cause the volume between the entrance and exit to be an acoustic choke. More specifically, body 10 includes a plate 16, 18 at each end of the vane array to form the restrictions. Plates 16, 18 are circular in shape and have rough edges to increase production of micro-vortices.

Figure 7:
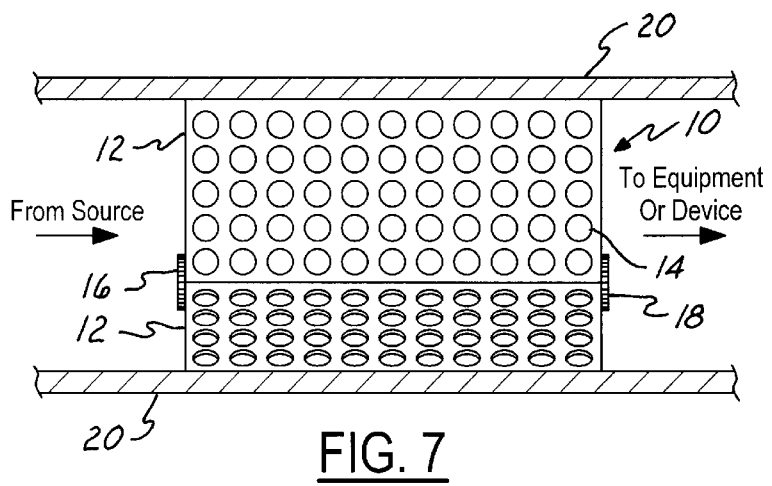
FIG. 7 illustrates a flow conditioner in combination with a conduit in accordance with the present invention.

In FIG. 7, the second embodiment of the flow conditioning device is shown received in a conduit 20. Fluid flow from a source is conditioned as it passes flow conditioner body 10 on its way to fluid handling equipment or flow measurement devices. Pores/perforations 14 in the surfaces of vanes 12 reduce asymmetric flow. Plates 16, 18 create a slight restriction in the cross-sectional area at the entrance and exit to the flow conditioner to counter pulsation by using the volume between the entrance and exit as an acoustic choke. The roughened edges about the circumference of the circular plates 16, 18 increase the production of micro-vortices which cause a stable and repeatable trip between turbulent and laminar flow states.

Preferred embodiments of the present invention effectively reduce large scale vortices in the flow, reduce pulsation in the flow velocity, reduce an asymmetrical flow field, and increase the rate of flow development from turbulent flow to laminar flow. These embodiments are usable in a wide variety of applications where there is a desire to condition fluid flow to create uniform flow field distributions to isolate fluid handling equipment and flow measurement devices from the effects of unstable or distorted flow fields entering the devices. The present invention comprehends a flow conditioner including a body composed of an array of vanes having surfaces with perforations. Preferred embodiments include more specific features, such as, for example, vane surfaces having a porosity ranging from 35% to 70%, entrance and exit restrictions to create an acoustic choke, and using plates with rough edges to form the restrictions.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A flow conditioner for placement within a length of conduit to condition fluid flow therethrough, the flow conditioner comprising:

a body of fixed length wherein the body length is less than the conduit length such that the body may be placed within the conduit such that fluid flowing through the conduit is conditioned as the fluid passes into and then out of the body, the body being composed of an array of vanes generally parallel to the direction of fluid flow to create a plurality of chambers to effectively reduce large scale vortices in the flow, the vanes having surfaces with perforations to allow pressure regulation between chambers to effectively reduce asymmetric flow and reduce drag wherein the vanes are arranged in a radial fashion with each vane extending radially from a central axis of the conduit.

2. The flow conditioner of claim 1 wherein there are exactly three vanes.

3. The flow conditioner of claim 1 wherein the vane surfaces each have a porosity ranging from 35% to 70%.

4. A flow conditioner for placement within a conduit to condition fluid flow therethrough, the flow conditioner comprising:

a body composed of an array of vanes generally parallel to the direction of fluid flow to create a plurality of chambers to effectively reduce large scale vortices in the flow, the vanes having surfaces with perforations to allow pressure regulation between chambers to effectively reduce asymmetric flow and reduce drag, wherein the body is configured to create a slight restriction in cross-sectional flow area at an entrance and an exit of the flow conditioner to cause a volume between the entrance and the exit to be an acoustic choke.

5. The flow conditioner of claim 4 wherein the body includes a plate at each end of the vane array to form the restrictions.

6. The flow conditioner of claim 5 wherein the plates are circular in shape.

7. The flow conditioner of claim 5 wherein the plates have rough edges to increase production of micro-vortices.

8. A flow conditioner for placement within a length of conduit to condition fluid flow therethrough, the flow conditioner comprising:

a body of fixed length wherein the body length is less than the conduit length such that the body may be placed within the conduit such that fluid flowing through the conduit is conditioned as the fluid passes into and then out of the body, the body being composed of an array of vanes generally parallel to the direction of fluid flow to create a plurality of chambers to effectively reduce large scale vortices in the flow, the vanes having surfaces with perforations to allow pressure regulation between chambers to effectively reduce asymmetric flow and reduce drag, wherein the vanes are arranged in a radial fashion with each vane extending radially from a central axis of the conduit, and wherein the vane surfaces each have a porosity ranging from 35% to 70%.

9. The flow conditioner of claim 8 wherein there are exactly three vanes.

10. A flow conditioner for placement within a conduit to condition fluid flow therethrough, the flow conditioner comprising:

a body composed of an array of vanes generally parallel to the direction of fluid flow to create a plurality of chambers to effectively reduce large scale vortices in the flow, the vanes having surfaces with perforations to allow pressure regulation between chambers to effectively reduce asymmetric flow and reduce drag, wherein the vanes are arranged in a radial fashion with each vane extending radially from a central axis of the conduit, and wherein the vane surfaces each have a porosity ranging from 35% to 70%, wherein the body is configured to create a slight restriction in cross-sectional flow area at an entrance and an exit of the flow conditioner to cause a volume between the entrance and the exit to be an acoustic choke.

11. The flow conditioner of claim 10 wherein the body includes a plate at each end of the vane array to form the restrictions.

12. The flow conditioner of claim 11 wherein the plates are circular in shape.

13. The flow conditioner of claim 11 wherein the plates have rough edges to increase production of micro-vortices.

14. In combination with a length of a conduit, the improvement comprising:

a flow conditioner placed within the conduit to condition fluid flow therethrough, the flow conditioner including a body of fixed length wherein the body length is less than the conduit length such that the body may be placed within the conduit such that fluid flowing through the conduit is conditioned as the fluid passes into and then out of the body, the body being composed of an array of vanes generally parallel to the direction of fluid flow to create a plurality of chambers to effectively reduce large scale vortices in the flow, the vanes having surfaces with perforations to allow pressure regulation between chambers to effectively reduce asymmetric flow and reduce drag wherein the vanes are arranged in a radial fashion with each vane extending radially from a central axis of the conduit.

15. The combination of claim 14 wherein there are exactly three vanes.

16. The combination of claim 14 wherein the vane surfaces each have a porosity ranging from 35% to 70%.

17. In combination with a conduit, the improvement comprising:
a flow conditioner placed within the conduit to condition fluid flow therethrough, the flow conditioner including a body composed of an array of vanes generally parallel to the direction of fluid flow to create a plurality of chambers to effectively reduce large scale vortices in the flow, the vanes having surfaces with perforations to allow pressure regulation between chambers to effectively reduce asymmetric flow and reduce drag wherein the body is configured to create a slight restriction in cross-sectional flow area at an entrance and an exit of the flow conditioner to cause a volume between the entrance and the exit to be an acoustic choke.

18. The combination of claim 17 wherein the body includes a plate at each end of the vane array to form the restrictions.

19. The combination of claim 18 wherein the plates are circular in shape.

20. The combination of claim 18 wherein the plates have rough edges to increase production of micro-vortices.

21. In combination with a length of conduit, the improvement comprising:
a flow conditioner placed within the conduit to condition fluid flow therethrough, the flow conditioner including a body of fixed length wherein the body length is less than the conduit length such that the body may be placed within the conduit such that fluid flowing through the conduit is conditioned as the fluid passes into and then out of the body, the body being composed of an array of vanes generally parallel to the direction of fluid flow to create a plurality of chambers to effectively reduce large scale vortices in the flow, the vanes having surfaces with perforations to allow pressure regulation between chambers to effectively reduce asymmetric flow and reduce drag, wherein the vanes are arranged in a radial fashion with each vane extending radially from a central axis of the conduit, and wherein the vane surfaces each have a porosity ranging from 35% to 70%.

22. The combination of claim 21 wherein there are exactly three vanes.

23. In combination with a conduit the improvement comprising:
a flow conditioner placed within the conduit to condition fluid flow therethrough, the flow conditioner including a body composed of an array of vanes generally parallel to the direction of fluid flow to create a plurality of chambers to effectively reduce large scale vortices in the flow, the vanes having surfaces with perforations to allow pressure regulation between chambers to effectively reduce asymmetric flow and reduce drag, wherein the vanes are arranged in a radial fashion with each vane extending radially from a central axis of the conduit, and wherein the vane surfaces each have a porosity ranging from 35% to 70%, wherein the body is configured to create a slight restriction in cross-sectional flow area at an entrance and an exit of the flow conditioner to cause a volume between the entrance and the exit to be an acoustic choke.

24. The combination of claim 23 wherein the body includes a plate at each end of the vane array to form the restrictions.

25. The combination of claim 24 wherein the plates are circular in shape.

26. The combination of claim 24 wherein the plates have rough edges to increase production of micro-vortices.

* * * * *